United States Patent [19]  [11] 4,325,934
Swindells et al. [45] Apr. 20, 1982

[54] PRODUCTION OF CHLORINE DIOXIDE WITH CONVERSION OF BY-PRODUCT SOLID PHASE SODIUM ACID SULPHATE TO ITS NEUTRAL FORM

[75] Inventors: Richard Swindells, Caledon; Maurice C. J. Fredette, Mississauga, both of Canada

[73] Assignee: Erco Industries Limited, Islington, Canada

[21] Appl. No.: 189,703

[22] Filed: Sep. 22, 1980

[51] Int. Cl.³ ................... C01B 11/02; C01B 17/90; C01B 5/00
[52] U.S. Cl. ................... 423/478; 423/479; 423/531; 423/551
[58] Field of Search ............... 423/478, 479, 480, 531, 423/551

[56] References Cited

U.S. PATENT DOCUMENTS 3,563,702 2/1971 Partridge ...................... 423/478
3,933,988 1/1976 Rosen ............................ 423/480
4,081,520 3/1978 Swindells ..................... 423/478
4,104,365 8/1978 Howard ........................ 423/551

OTHER PUBLICATIONS

Butler et al. "The Action of Alcohol on the Sulphates of Sodium" J. Chem. Soc., 117 (1920) pp. 649-667.

Primary Examiner—Brian E. Hearn
Attorney, Agent, or Firm—Sim & McBurney

[57] ABSTRACT

A highly efficient chlorine dioxide generating process which produces chlorine-free chlorine dioxide and neutral solid phase sodium sulphate from sodium chlorate, sulphuric acid and methanol is described. Solid phase sodium acid sulphate recovered from the high acidity reaction medium is metathesized using controlled quantities of water and controlled quantities of methanol to form the solid phase neutral sodium sulphate. Sulphuric acid recovered from the acid sulphate by the metathesis is recycled to the generator along with a part of the methanol used in the metathesis.

19 Claims, 1 Drawing Figure

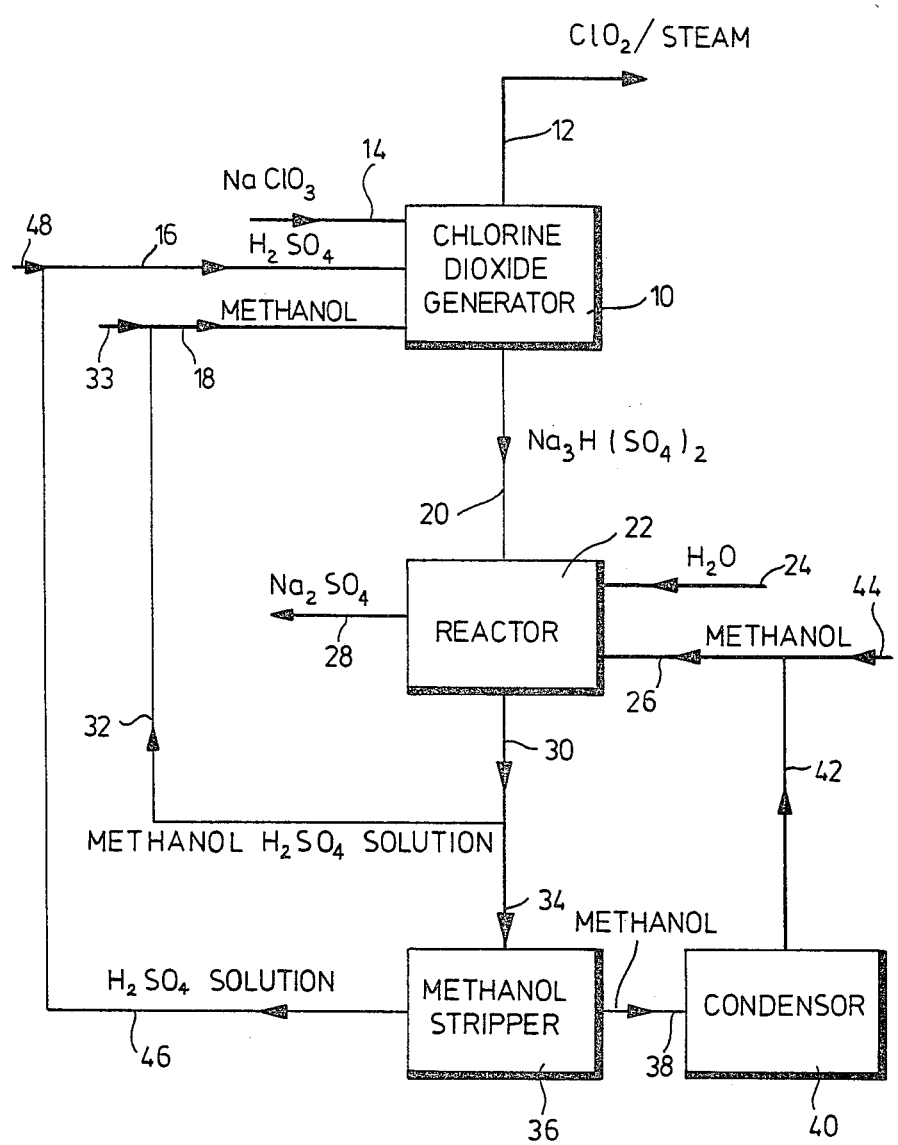

PRODUCTION OF CHLORINE DIOXIDE WITH CONVERSION OF BY-PRODUCT SOLID PHASE SODIUM ACID SULPHATE TO ITS NEUTRAL FORM

FIELD OF INVENTION

The present invention relates to the production of chlorine dioxide at high efficiency.

BACKGROUND TO THE INVENTION

In U.S. Pat. No. 4,081,520, assigned to the assignee of this application, the disclosure of which is incorporated herein by reference, there is described a process for the production of chlorine dioxide at high efficiency using sodium chlorate, sulphuric acid and methanol. The mechanism whereby chlorine dioxide is formed is that chlorine which is coproduced with the chlorine dioxide is reacted with the methanol to form chloride ions which then reduce the chlorate ions to form chlorine dioxide and chlorine. The overall reaction may be represented by the following equation:

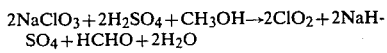
$$2NaClO_3 + 2H_2SO_4 + CH_3OH \rightarrow 2ClO_2 + 2NaHSO_4 + HCHO + 2H_2O$$

The reaction medium from which the chlorine dioxide is formed and which contains sodium chlorate, methanol and sulphuric acid is maintained at its boiling point, generally in the range of about 50° to about 85° C., under a subatmospheric pressure. The evaporated water serves to dilute the chlorine dioxide for removal from the reaction zone. The reaction medium has a high total acid normality in excess of about 9 normal and the by-product deposited from the reaction medium once saturation is reached after start up is a sodium acid sulphate, which may be sodium bisulphate ($NaHSO_4$) or sodium sesquisulphate ($Na_3H(SO_4)_2$).

The process of the prior patent is highly efficient in terms of the conversion of chlorate ions to chlorine dioxide. Close to 100% efficiency is attained and the chlorine dioxide is removed from the reaction zone virtually uncontaminated by chlorine, which may be beneficial in many instances of end use of the chlorine dioxide.

The drawback to this prior art process which heretofore has inhibited commercial implementation thereof is the form and nature of the solid by-product. Since the sodium sulphate precipitates in an acid form, removal of this material from the reaction zone results in a loss of the acid values therein. In addition, sodium acid sulphates are difficult to handle physically and exhibit deliquescence.

SUMMARY OF INVENTION

The present invention enables this prior art problem to be overcome by metathesizing the solid phase sodium acid sulphate in a unique manner to form solid phase neutral sodium sulphate and recovering the acid values for recycle to the reaction zone.

Although the present invention is particularly described herein with respect to the conversion of sodium acid sulphate formed in the procedure of the aforementioned U.S. Pat. No. 4,081,520 to a neutral sodium sulphate, the present invention is broadly applicable to the conversion to a neutral sulphate of a solid acid sulphate recovered from any high acidity sulphuric acid based chlorine dioxide generating process in which the reaction medium is maintained at its boiling point under a subatmospheric pressure and in which the acid sulphate precipitates from the reaction medium in the reaction zone.

For example, the process of the invention is applicable to the conversion of sodium acid sulphate by-product recovered from a chlorine dioxide generator wherein added chloride ions are used as the reducing agent for the chlorate in the presence of high acidity sulphuric acid, as described in Canadian Pat. No. 825,084, to the assignee of this application.

Further, the chlorine dioxide generating process producing the sodium acid sulphate may be one in which sulphur dioxide is used to reduce the coproduced chlorine to chloride ions, in analogous manner to the methanol in the process of U.S. Pat. No. 4,081,520 as discussed above. The use of sulphur dioxide is described in U.S. Pat. No. 3,933,988, assigned to Hooker Chemicals & Plastics Corporation.

In the process of the present invention, the solid phase acid sulphate removed from the reaction zone is contacted with water in the presence of a water-soluble alcohol or ketone, preferably methanol, to form solid phase neutral sulphate and to recover the sulphuric acid.

GENERAL DESCRIPTION OF INVENTION

There has been a prior suggestion to utilize water and methanol or other water-soluble alcohol or ketone to convert sodium acid sulphate to neutral sodium sulphate. Such procedure is described in U.S. Pat. No. 4,104,365 in the names of Howard and Lobley. The process of the latter patent is directed to the recovery of neutral sodium sulphate from the liquid phase effluent from high total acid normality sulphuric acid based chlorine dioxide producing processes. Such processes do not operate at the boiling point of the reaction medium and do not crystallize the by-product sodium sulphate from the reaction medium in the reaction vessel. The starting material in this prior art process is an aqueous solution of the sodium acid sulphate, in contrast to the solid phase starting material used in this invention.

The prior art procedure involves an initial stripping step which is said to be required to remove dissolved gases and residual sodium chlorate which otherwise inhibit the reaction. Such an operation is not required for the process of this invention since the starting material is solid phase sodium acid sulphate produced in the chorine dioxide generating reaction zone.

The process of the present invention is distinguished from the prior art procedure not only on the ground that the starting materials are in different physical forms but also since the volumes of water and methanol required to be added to the aqueous effluent to form solid phase neutral sodium sulphate in the prior art process are very much greater than the volumes used in the process of this invention. As a consequence of these large volumes of water and methanol, considerable evaporation is required in the prior art process, first of all to recover the methanol used and secondly to concentrate the aqueous sulphuric acid to a concentration which is suitable for reuse in the generator.

In the process of the present invention, the weight ratio of water to sodium acid sulphate (calculated as $Na_3H(SO_4)_2$) is about 0.4:1 to about 1.4:1, preferably about 0.6:1 to about 0.8:1. Ratios of water to sodium acid sulphate within the recited range are critical to the process of the present invention, in that less than an 0.4:1 weight ratio leads to only poor conversions of acid sulphate to neutral sulphate while greater than a 1.4:1 weight ratio leads to large quantities of sodium sulphate being dissolved in the aqueous phase. By using weight ratios within this critical range, the aqueous phase which results contains sulphuric acid of a sufficient acid normality to permit recycle thereof to the chlorine dioxide generating process without concentration.

In contrast, in a typical operation according to the process of U.S. Pat. No. 4,104,365 referred to above, the weight ratio of water to sodium acid sulphate (considered as $Na_3H(SO_4)_2$) is about 1.83:1 and the weight of water required to be removed to enable the sulphuric acid solution to be reused is about 3.6 lb. per lb. of neutral sodium sulphate recovered (or about 4.14 lb. per lb. of $ClO_2$ formed).

The weight ratio of methanol to sodium acid sulphate (calculated as $Na_3H(SO_4)_2$) is less critical than the water weight ratio and may vary up to about 2:1. The weight ratio of methanol to sodium acid sulphate is preferably about 0.3:1 to about 0.8:1 for the preferred weight ratio of water to sodium and sulphate referred to above. In view of its miscibility in water, the presence of the methanol decreases the volume of water in which the sodium sulphate is able to dissolve and hence inhibits dissolution of the neutral sodium sulphate in the aqueous phase.

As the weight ratio of methanol increases, the proportion of neutral sodium sulphate dissolved in the aqueous phase decreases until a weight ratio of methanol is reached beyond which further quantities of methanol do not increase the yield of solid phase neutral sodium sulphate, the yield limit being about 80 to 85 wt.%. No benefit, therefore, is gained by increasing the weight ratio of methanol to sodium acid sulphate beyond about 2:1.

When the preferred process of the invention is adopted, namely, when the chlorine dioxide is produced by the process of the above-mentioned U.S. Pat. No. 4,081,520, a proportion of the aqueous phase resulting from the metathesis may be recycled directly to the chlorine dioxide producing reaction medium to provide at least part, preferably all, of the methanol requirement thereof. This recycle stream also provides part of the sulphuric acid requirement of the chlorine dioxide-forming process. Methanol which is recycled to the reaction medium in this way does not require to be recovered from the recycled proportion of the aqueous phase. Methanol is removed from the remainder of the aqueous phase to provide a sulphuric acid solution suitable for recycle to the generator.

The quantities of methanol used in this invention contrast markedly with those used in the prior art procedure of U.S. Pat. No. 4,104,365 wherein typically a weight ratio of methanol to sodium acid sulphate (considered as $Na_3H(SO_4)_2$) of about 9.33:1 is used and must be recovered for reuse and so that the sulphuric acid solution can be concentrated to an acid normality suitable for recycle to the chlorine dioxide producing process.

The steam requirement of the process of the present invention for evaporation of the aqueous phase is limited to that required to strip methanol and in a typical preferred embodiment of the invention gives rise to a cost of about $2.50 per ton of chlorine dioxide produced (calculated at a cost of $3 per 1000 lb. of steam). This steam requirement is substantially less than for the process of U.S. Pat. No. 4,104,365 wherein heat is required to strip substantial quantities of methanol and to concentrate the sulphuric acid solution and in a typical embodiment thereof gives rise to a cost of about $35.00 per ton of chlorine dioxide produced, i.e. nearly fifteen times the cost of steam required for the process of this invention.

Usually the water and methanol are added to the solid phase sodium acid sulphate as a solution containing the required proportions of water and methanol. Since, however, the role of the methanol is exclusively to effect the decrease in solubility of the neutral sodium sulphate in the aqueous phase, the methanol may be added after initial addition of the water.

The above description of the process of the invention has been made with respect to the use of methanol, in view of the ready availability of the solvent and the effectiveness of the solvent in the process of the invention. Other water-soluble alcohols and ketones, however, may be used, if desired, for example, methanol, n-propanol, isopropanol and acetone.

The metathesis reaction used in this invention may be effected over a wide range of temperatures, usually from about 10° to about 70° C. The reaction proceeds effectively at room temperature (about 20° to 25° C.) although elevated temperatures usually are preferred as the rate of reaction increases with increasing temperature. Preferably, the temperature is in the range of about 20° to about 50° C.

The metathesis reaction of the present invention may be effected in any convenient manner. Although a batch operation may be effected, continuous operation is preferred since the process of the invention is associated with a continuous chlorine dioxide producing process.

The metathesis may be effected in a simple reaction vessel or in a decantation-washing column, such as is described in detail in U.S. patent application Ser. No. 971,790 filed Dec. 21, 1978 (E140), assigned to the assignee of this application, the disclosure of which is incorporated herein by reference.

Intermixing of the water-methanol solution with the sodium acid sulphate to effect the metathesis reaction may be assisted by stirring in a reaction vessel. Although stirring speeds up the mass transfers involved in the metathesis, high shear is unnecessary and gentle stirring only need be used, although consuming a longer period of time.

The reaction time required for completion of the metathesis may vary widely, and usually is from about 10 minutes at high stirring to about 60 minutes in a decantation washer.

BRIEF DESCRIPTION OF DRAWING

The single FIGURE of the accompanying drawing is a flow sheet illustrating one embodiment of the invention.

DESCRIPTION OF PREFERRED EMBODIMENT

Referring to the drawing, a chlorine dioxide generator 10 produces a gaseous mixture of chlorine dioxide and steam in line 12 from which chlorine dioxide is absorbed into water to provide an aqueous solution thereof for utilization in bleaching wood pulp or any other desired end use.

The generator 10 produces the chlorine dioxide in accordance with the procedure of the aforementioned U.S. Pat. No. 4,081,520 from sodium chlorate solution fed to the generator 10 by line 14, sulphuric acid fed to the generator 10 by line 16 and methanol fed to the generator 10 by line 18.

The aqueous reaction medium, which has a total acid normality of greater than about 9, is maintained at its boiling point below a temperature above which substantial decomposition of chlorine dioxide occurs, usually in the range of about 30° to about 85° C., under a subatmospheric pressure corresponding to the boiling point, usually in the range of about 20 to about 400 mmHg, and sodium acid sulphate continuously precipitates from the reaction medium once the reaction medium reaches saturation after start up.

The volume of the reaction medium in the generator 10 is maintained substantially constant by balancing the volume of aqueous phase entering the generator 10 with the volume of water evaporated from the reaction medium to form the gaseous product stream 12 and the volume of water removed as slurry medium for the solid phase sodium acid sulphate.

The sodium acid sulphate precipitated from the reaction medium in the generator 10 is forwarded by line 20 to a reactor 22. The sodium acid sulphate, usually sodium sesquisulphate, may be removed from the generator 10 in the form of a slurry with reaction medium and separated therefrom by filtration prior to passage to the reactor 22.

In the reactor 22, the sodium acid sulphate is contacted with water fed by line 24 and methanol fed by line 26. The weight ratio of water to sodium acid sulphate (calculated as $Na_3H(SO_4)_2$) in the reactor is about 0.4:1 to about 1.4:1, preferably about 0.6:1 to about 0.8:1. The weight ratio of methanol to sodium acid sulphate (calculated as $Na_3H(SO_4)_2$) is up to about 2:1, preferably about 0.3:1 to about 0.8:1.

The temperature of the media contacting the solid phase sodium acid sulphate in the reactor 22 is preferably about 20° to about 50° C. and the metathesis reaction produces solid anhydrous neutral sodium sulphate. The metathesis of the sodium acid sulphate produces sulphuric acid in addition to the neutral acid sulphate. The neutral sodium sulphate and the aqueous phase are separated in any convenient manner, such as on a filter, and the neutral sodium sulphate is removed by line 28, for utilization as desired, typically to make up sodium and sulphur values in a pulp mill with which the chlorine dioxide generator 10 is associated.

The aqueous phase, containing sulphuric acid, methanol and some dissolved sodium sulphate, is removed by line 30 and is split into two streams, with typically approximately one-third of the volume of the aqueous phase being recycled by line 32 to the methanol feed line 18 to the chlorine dioxide generator so as to provide at least part, preferably all, of the methanol requirement of the generator 10, any remainder of such requirement being fed by line 33 to the methanol feed line 18. The sulphuric acid content of the aqueous phase in line 32 provides part of the sulphuric acid requirement of the reaction medium in the generator 10.

The remaining typically approximately two-thirds of the volume of the aqueous phase is forwarded by line 34 to a methanol stripper 36 wherein the methanol is removed from the aqueous phase. The methanol vapor is passed by line 38 to a condenser 40 to result in liquid methanol, which is forwarded by line 42 to the methanol feed line 26 to the metathesis reactor 22, the balance of the methanol requirement of the reactor 22 being fed by line 44.

The methanol-depleted sulphuric acid solution is recycled by line 46 to the sulphuric acid feed stream for the chlorine dioxide generator 10 in line 16. Additional sulphuric acid requirement is fed by line 48 to the sulphuric acid feed line 16.

The process described above with respect to the drawing, therefore, produces chlorine dioxide which is essentially chlorine-free at high efficiency without the necessity for the addition of any catalytic species to the reaction medium. At the same time, the by-product sodium sulphate is obtained in a neutral, preferably anhydrous neutral form, so that no sulphuric acid is lost from the system with the by-product. The system uses one of the reactants, namely, methanol, in the conversion of the acid sulphate to the neutral sulphate.

EXAMPLES

EXAMPLE 1

This Example illustrates the preparation of sodium acid sulphate in accordance with the procedure of U.S. Pat. No. 4,081,520.

A chlorine dioxide generator was run to form chlorine dioxide from sodium chlorate, sulphuric acid and methanol. The reaction medium was held at its boiling point under a subatmospheric pressure and sodium sesquisulphate deposited from the reaction medium. The operating parameters are set forth in the following Table I:

TABLE I

| Operating conditions: | |
|---|---|
| temperature | 74° C. |
| pressure | 135 mm Hg |
| Reactants concentration and feed rate: | |
| MeOH | 33%, 3.4 ml/min. |
| $H_2SO_4$ | 9M, 3.6 ml/min. |
| $NaClO_3$ | 6.74M, 10.5 ml/min. |
| Generator liquor concentrations: | |
| $H_2SO_4$ | 9.3N |
| $NaClO_3$ | 1.1M |
| Crystal | $Na_3H(SO_4)_2$ |
| Chlorine dioxide production: | |
| rate | 0.48 g/l/min. |
| efficiency based on chlorate | > 99% |
| gas analysis | $ClO_2$ > 99%, $Cl_2$ < 1% |

EXAMPLE II

This Example illustrates metathesis of sodium sesquisulphate.

A series of experiments was conducted in which 100 g samples of solid sodium sesquisulphate were contacted with water and/or methanol under a variety of conditions. In each case, the weight of sodium sulphate recovered, the proportion of sulphuric acid remaining in the sodium sulphate and the normality of the aqueous phase at the end of the experiment were determined. The results are reproduced in the following Table II:

TABLE II

| Expt. No. | Wt. Ratio $H_2O:Na_3H(SO_4)_2$ | Wt. Ratio $MeOH:Na_3H(SO_4)_2$ | Temp. °C. | Stirring Time Mins. | Type of Stirring | $Na_2SO_4$ Recovered g[1] | % $H_2SO_4$ in $Na_2SO_4$ | Normality of Aq. Phase[2] |
|---|---|---|---|---|---|---|---|---|
| 1 | 0.6:1 | 0 | 40 | 7 | SM[3] | —[4] | 9.8 | 6.4 |

TABLE II-continued

| Expt. No. | Wt. Ratio H$_2$O:Na$_3$H(SO$_4$)$_2$ | Wt. Ratio MeOH:Na$_3$H(SO$_4$)$_2$ | Temp. °C. | Stirring Time Mins. | Type of Stirring | Na$_2$SO$_4$ Recovered g[1] | % H$_2$SO$_4$ in Na$_2$SO$_4$ | Normality of Aq. Phase[2] |
|---|---|---|---|---|---|---|---|---|
| 2 | 0.6:1 | 0.8:1 | 40 | 8 | SM | — | 6.5 | 6.4 |
| 3 | 0 | 1.1:1 | 20 | 10 | FM[5] | 99 | 15.2 | very high |
| 4 | 0.8:1 | 2.5:1 | 20 | 10 | SM | — | 2.9 | 4.8 |
| 5 | 0.8:1 | 2.5:1 | 20 | 11 | SM | — | 19.0 | —[6] |
| 6 | 0.8:1 | 2.5:1 | 20 | 11 | none | — | 12.7 | 4.8 |
| 7 | 0.8:1 | 2.5:1 | 20 | 10 | none | — | 14.7 | 4.8 |
| 8 | 0.8:1 | 2.5:1 | 20 | 10 | none | — | 17.6 | 4.8 |
| 9 | 0.4:1 | 0 | 62 | 10 | SM | — | 6.3 | 9.6[7] |
| 10 | 0.6:1 | 0 | 40 | 10 | SM | — | 2.7 | 6.4 |
| 11 | 0.8:1 | 0 | 43 | 10 | SM | — | 0.1 | 4.8 |
| 12 | 1.0:1 | 0 | 45 | 10 | SM | — | 1.2 | 3.8 |
| 13 | 1.2:1 | 0 | 36 | 10 | SM | — | 0.96 | 3.2 |
| 14 | 1.4:1 | 0 | 40 | 10 | SM | None | — | 2.7 |
| 15 | 0.6:1 | 0 | 40 | 11 | SM | 30.1 | 1.4 | 6.3 |
| 16 | 0.8:1 | 0 | 47 | 10 | SM | 22.3 | 0.4 | 4.8 |
| 17 | 1.0:1 | 0 | 47 | 10 | SM | 12 | 0.4 | 3.8 |
| 18 | 0.8:1 | 0 | 45 | 10 | HP[8] | — | 22.9 | 4.8 |
| 19 | 1.0:1 | 0 | 45 | 10 | HP | — | 1.4 | 3.8 |
| 20 | 1.2:1 | 0 | 45 | 10 | HP | — | 9.7 | 3.2 |
| 21 | 1.4:1 | 0 | 45 | 10 | HP | — | 9.8 | 2.7 |
| 22 | 0.857:1 | 0.1:1 | 20 | 15 | SM | 37.5 | 0.73 | 4.4 |
| 23 | 0.75:1 | 0.2:1 | 20 | 17 | SM | 52.3 | 0.94 | 5.1 |
| 24 | 0.5:1 | 0.4:1 | 20 | 18 | SM | 74.5 | 5.0 | 7.6[9] |
| 25 | 0.25:1 | 0.6:1 | 20 | 15 | SM | 88 | 11.6 | 15.3[10] |
| 26 | 0.125:1 | 0.7:1 | 20 | 15 | SM | 93.3 | 18.4 | 30.6 |
| 27 | 0.75:1 | 0.2:1 | 48 | 14 | SM | 46.3 | 0.72 | 5.1 |
| 28 | 0.5:1 | 0.4:1 | 48 | 14 | SM | 67.3 | 0.84 | 7.6 |
| 29 | 0.25:1 | 0.6:1 | 48 | 15 | SM | 84.5 | 10.4 | 15.3[11] |
| 30 | 0.75:1 | 0.4:1 | 19 | 15 | SM | 64.5 | 0.56 | 5.1 |
| 31 | 0.75:1 | 0.6:1 | 19 | 15 | SM | 67.3 | 0.34 | 5.1 |
| 32 | 0.75:1 | 0.8:1 | 19 | 15 | SM | 70.7 | 0.13 | 5.1 |
| 33 | 0.75:1 | 1.0:1 | 19 | 15 | SM | 64.5 | 0.43 | 5.1 |
| 34 | 0.645:1 | 0.34:1 | 19 | 15 | SM | 63.3 | 0.53 | 5.9 |
| 35 | 0.555:1 | 0.29:1 | 19 | 15 | SM | 71.3 | 2.0 | 6.9[12] |
| 36 | 0.555:1 | 0.29:1 | 19 | 15 | SM | 71.3 | 3.3 | 6.9[13] |
| 37 | 0.555:1 | 0.29:1 | 19 | 15 | HM | 65.8 | 4.9 | 6.9[14] |
| 38 | 0.555:1 | 0.29:1 | 50 | 15 | SM | 38.8 | 2.4 | 6.9[15] |
| 39 | 0.555:1 | 0.29:1 | 50 | 15 | HM | 44.5 | 0.35 | 6.9 |
| 40 | 0.6:1 | 0.4:1 | 19 | 15 | SM | 66 | 1.8 | 6.4 |
| 41 | 0.75:1 | 0.4:1 | 19 | 15 | SM | — | 0.34 | 5.1[16] |
| 42 | 0.75:1 | 0.4:1 | 19 | 15 | SM | — | 0.26 | 5.1[17] |
| 43 | 0.75:1 | 0.4:1 | 19 | 15 | SM | — | 0.17 | 5.1[18] |
| 44 | 0.77:1 | 0.41:1 | 19 | 10 | SM | 60.5 | 0.46 | 5.1[19] |
| 45 | 0.75:1 | 0.4:1 | 19 | ON[20] | VS[21] | 55 | 0.31 | 5.1 |

Notes:
[1] A yield of 81.3 g of Na$_2$SO$_4$ is attainable at 100% conversion.
[2] Calculated for liberated H$_2$SO$_4$ in aqueous phase.
[3] SM means slow magnetic stirring just sufficient to form a vortex.
[4] — means that the quantity of sodium sulphate was not determined.
[5] FM means fast magnetic stirring sufficient to cause splashing.
[6] In this experiment NaHSO$_4$ was converted to Na$_3$H(SO$_4$)$_2$.
[7] 6.4 N actually reached due to incomplete metathesis.
[8] HP means hand pouring from one beaker to another steadily for the "stirring time".
[9] 5.6 N actually reached due to incomplete metathesis.
[10] 5.8 N actually reached due to incomplete metathesis
[11] 6.8 N actually reached due to incomplete metathesis.
[12] 6.5 N actually reached due to incomplete metathesis.
[13] 5.7 N actually reached due to incomplete metathesis.
[14] 5.1 N actually reached due to incomplete metathesis.
[15] 6.0 N actually reached due to incomplete metathesis.
[16] 16.7 ppm Cr (VI) added to liquor.
[17] 167 ppm Cr (VI) as K$_2$CrO$_4$ added to liquor.
[18] 1670 ppm Cr (VI) added to liquor.
[19] Cr (III) present in Na$_3$H(SO$_4$)$_2$ - 49.8 ppm and in Na$_2$SO$_4$ - 76.2 ppm.
[20] ON means overnight.
[21] VS means very slow at approx. 75 rpm.

The results of the above Table II illustrate a number of points. A comparison of experiments 1 and 2 illustrates that the addition of methanol for additional volume is not very helpful in the metathesis. Experiment 3 shows that methanol alone is unable to achieve metathesis. A comparison of Experiment 4 with Experiment 2 shows that increasing the volume of water also increases the metathesis. Experiments 6, 7 and 8 show that little or no metathesis is attained in the absence of stirring.

Experiments 9 to 14 show the effect of increasing quantities of water and were used to determine the minimum weight ratio of water to sodium sesquisulphate required for complete metathesis. Experiments 15 to 17 show the actual quantities of sodium sulphate (Na$_2$SO$_4$) recovered using water only. Experiments 18 to 21 were used to determine the effect of minimal stirring and some or all the acid sulphate was converted to Na$_2$SO$_4$.

Experiments 22 to 26 illustrate the effect of water and methanol mixtures on metathesis at room temperature while Experiments 27 to 29 illustrate the effect of such mixtures at 48° C. Experiments 30 to 33 illustrate the effect of increasing quantities of methanol on yield of $Na_2SO_4$.

Experiments 34 and 35 attempt to determine the minimum water requirement while Experiments 36 to 39 attempt to determine the effect of temperature and stirring on marginal cases.

Experiments 41 to 44 illustrate the effect of chromium on the process while Experiment 45 shows the effect of prolonged slow stirring.

EXAMPLE III

This Example illustrates the use of solvents other than methanol.

The procedure of Example II was repeated except that acetone and ethanol were substituted for methanol in two runs effected at 19° C. for 10 minutes with slow stirring. The results are reproduced in the following Table III:

TABLE III

| Solvent | Weight Ratio $H_2O:Na_3H(SO_4)_2$ | Weight Ratio Solvent: $Na_3H(SO_4)_2$ | Wt. of $Na_2SO_4$ Recovered (g) | % $H_2SO_4$ in $Na_2SO_4$ | Normality of Aqueous Phase |
|---|---|---|---|---|---|
| Acetone | 0.75:1 | 0.4:1 | 62.4 | 1.6 | 5.1 |
| Ethanol | 0.75:1 | 0.4:1 | 75.9 | 0.13 | 5.1 |

The results of the above Table III illustrate the utility of acetone and ethanol in the metathesis reaction.

SUMMARY OF DISCLOSURE

In summary of this disclosure, the present invention provides a highly efficient chlorine dioxide generating process in which chlorine dioxide uncontaminated by chlorine is formed and neutral sodium sulphate by-product is produced. Modifications are possible within the scope of this invention.

What we claim is:

1. A process for the conversion of solid phase sodium acid sulphate to solid phase neutral sodium sulphate, which comprises:
   contacting said sodium acid sulphate while in said solid phase with water in a weight ratio of water to sodium acid sulphate (calculated as $Na_3H(SO_4)_2$) from about 0.6:1 to about 0.8:1 and with methanol in a weight ratio of methanol to sodium acid sulphate (calculated as $Na_3H(SO_4)_2$) from about 0.3:1 to about 0.8:1 to form solid phase neutral sodium sulphate from said solid phase sodium acid sulphate and an aqueous phase containing sulphuric acid, and
   separating the aqueous phase from the solid phase neutral sodium sulphate.

2. The process of claim 1 effected at a temperature of about 10° to about 70° C.

3. The process of claim 2 effected at a temperature of about 20° to about 50° C.

4. The process of claim 1 wherein relative motion is induced between said sodium acid sulphate and said water and methanol during said contacting step.

5. The process of claim 1 or 4 wherein said sodium acid sulphate is sodium sesquisulphate.

6. The process of claim 1 wherein said sodium acid sulphate is formed as the solid phase by-product of a process for the production of chlorine dioxide from an aqueous acid reaction medium containing sodium chlorate and sulphuric acid which is maintained at its boiling point under a subatmospheric pressure.

7. A process for the production of chlorine dioxide, which comprises:
   reducing chlorate ions in a reaction zone with chloride ions in an aqueous acid reaction medium containing sulphuric acid in an amount greater than about 6 normal to form chlorine dioxide and chlorine,
   maintaining said reaction medium at its boiling point under a subatmospheric pressure applied to said reaction zone while precipitating a sodium acid sulphate from the reaction medium,
   removing said precipitated sodium acid sulphate salt from the reaction medium,
   contacting said removed sodium acid sulphate salt with water in a weight ratio of water to sodium acid sulphate (calculated as $Na_3H(SO_4)_2$) from about 0.6:1 to about 0.8:1 and with a water soluble solvent selected from methanol, ethanol and acetone in a weight ratio of water soluble solvent to sodium acid sulphate (calculated as $Na_3H(SO_4)_2$) from about 0.3:1 to about 0.8:1 to cause conversion of said sodium acid sulphate to neutral sodium sulphate and formation of an aqueous phase containing sulphuric acid, and
   removing solvent from said aqueous phase.

8. The process of claim 7 wherein said water-soluble solvent is methanol.

9. The process of claim 7 or 8 wherein said chloride ions are provided in said aqueous reaction medium from external sources.

10. The process of claim 7 or 8 wherein said chloride ions are formed in situ by reduction of the chlorine which is coproduced with the chlorine dioxide.

11. The process of claim 10 wherein said reduction of chlorine is effected using sulphur dioxide.

12. The process of claim 10 wherein said reduction of chlorine is effected using methanol.

13. The process of claim 9 or 10 wherein said sulphuric acid normality is greater than about 9 normal.

14. The process of claim 7 wherein the aqueous phase remaining from said solvent removal is recycled to said reaction medium.

15. In a process for producing chlorine dioxide by reducing sodium chlorate with methanol in an aqueous reaction medium containing sulphuric acid in the substantial absence of added chloride ions by:
   (a) maintaining a reaction zone containing said aqueous reaction medium under a subatmospheric pressure and maintaining said reaction medium at its boiling point at a temperature below that above which substantial decomposition of chlorine dioxide occurs to evaporate water from the reaction medium and provide a gaseous mixture containing steam and chlorine dioxide,
   (b) removing said gaseous mixture from said reaction zone and recovering an aqueous solution of chlorine dioxide from said removed mixture, (c) continuously feeding said sodium chlorate, methanol and sulphuric acid into said reaction medium to make up chemicals consumed in said reducing step and to maintain a total acid normality in said reaction medium in excess of about 9 normal, (d) maintaining the liquid level in said reaction zone substantially constant by balancing water fed to the reaction zone with water removed therefrom, (e) continuously depositing a sodium acid sulphate from said reaction medium after the reaction medium becomes saturated thereby after the initial start up of the process, and (f) removing said deposited sodium acid sulphate from said reaction zone, the improvement which comprises:

(g) contacting said removed sodium acid sulphate with water in a weight ratio of water to sodium acid sulphate (calculated as $Na_3H(SO_4)_2$) from about 0.6:1 to about 0.8:1 and with methanol in a weight ratio of methanol to sodium acid sulphate (calculated as $Na_3H(SO_4)_2$) from about 0.3:1 to about 0.8:1 to cause the formation of solid phase neutral sodium sulphate from the sodium acid sulphate and an aqueous phase containing sulphuric acid, and (h) separating the aqueous phase from the solid phase neutral sodium sulphate.

16. The process of claim 15 wherein said separated aqueous phase is recycled to said reaction medium.

17. In a process of producing chlorine dioxide by reducing sodium chlorate with methanol in an aqueous reaction medium containing sulphuric acid in the substantial absence of added chloride ions by:

(a) maintaining a reaction zone containing said aqueous reaction medium under a subatmospheric pressure and maintaining said reaction medium at its boiling point at a temperature below that above which substantial decomposition of chlorine dioxide occurs to evaporate water from the reaction medium and provide a gaseous mixture containing steam and chlorine dioxide, (b) removing said gaseous mixture from said reaction zone and recovering an aqueous solution of chlorine dioxide from said removed mixture, (c) continuously feeding said sodium chlorate, methanol and sulphuric acid into said reaction medium to make up chemicals consumed in said reducing step and to maintain a total acid normality in said reaction medium in excess of about 9 normal, (d) maintaining the liquid level in said reaction zone substantially constant by balancing water fed to the reaction zone with water removed therefrom, (e) continuously depositing a sodium acid sulphate from said reaction medium after the reaction medium becomes saturated thereby after the initial start up of the process, and (f) removing said deposited sodium acid sulphate from said reaction zone, the improvement which comprises:

(g) contacting said removed sodium acid sulphate with water in a weight ratio of water to sodium acid sulphate (calculated as $Na_3H(SO_4)_2$) from about 0.4:1 to about 1.4:1 and with methanol in a weight ratio of methanol to sodium acid sulphate (calculated as $Na_3H(SO_4)_2$) up to about 2:1 to cause the formation of solid phase neutral sodium sulphate from the sodium acid sulphate and an aqueous phase containing sulphuric acid, (h) separating the aqueous phase from the solid phase neutral sodium sulphate, (i) separating said aqueous phase into two streams, one of said streams containing up to sufficient methanol required by the chlorine dioxide-forming reaction, (j) recycling said one stream to said reaction medium to provide methanol and sulphuric acid thereto, (k) removing methanol from the other of said streams, (l) recycling said other of said streams after said removal of methanol therefrom to said reaction medium to provide sulphuric acid thereto, and (m) recycling the removed methanol to said contacting step (g).

18. The process of claim 17 wherein said weight ratio of water to sodium acid sulphate is about 0.6:1 to about 0.8:1 and said weight ratio of methanol to sodium acid sulphate is about 0.3:1 to about 0.8:1.

19. The process of claim 15 or 17 wherein relative motion is induced between said sodium acid sulphate and said water and methanol during said contacting step.

* * * * *